United States Patent
Hetzer et al.

(10) Patent No.: US 9,994,397 B2
(45) Date of Patent: Jun. 12, 2018

(54) DEVICE AND METHOD FOR PORTIONING A FLOW OF INDIVIDUAL PRODUCTS

(71) Applicant: LOESCH Verpackungstechnik GmbH, Altendorf (DE)

(72) Inventors: Tobias Hetzer, Erlangen (DE); Roland Pleichinger, Kirchehrenbach (DE)

(73) Assignee: LOESCH VERPACKUNGSTECHNIK GMBH, Altendorf (DE)

( * ) Notice: Subject to any disclaimer, the term of this patent is extended or adjusted under 35 U.S.C. 154(b) by 0 days. days.

(21) Appl. No.: 15/116,782

(22) PCT Filed: Feb. 3, 2015

(86) PCT No.: PCT/EP2015/052123
§ 371 (c)(1),
(2) Date: Aug. 4, 2016

(87) PCT Pub. No.: WO2015/117931
PCT Pub. Date: Aug. 13, 2015

(65) Prior Publication Data
US 2016/0347547 A1    Dec. 1, 2016

(30) Foreign Application Priority Data
Feb. 5, 2014    (DE) .................. 10 2014 202 087

(51) Int. Cl.
*B65G 47/46*    (2006.01)
*B65G 21/14*    (2006.01)
(Continued)

(52) U.S. Cl.
CPC .............. *B65G 21/14* (2013.01); *B65B 23/12* (2013.01); *B65G 47/31* (2013.01); *B65G 47/647* (2013.01); *B65G 47/71* (2013.01)

(58) Field of Classification Search
CPC ..... B65G 21/14; B65G 47/644; B65G 47/647
(Continued)

(56) References Cited

U.S. PATENT DOCUMENTS

| | | | |
|---|---|---|---|
| 3,224,758 A | 12/1965 | Siempelkamp |
| 3,648,820 A | 3/1972 | Schafer |

(Continued)

FOREIGN PATENT DOCUMENTS

| | | | |
|---|---|---|---|
| CN | 101848839 A | 9/2010 |
| CN | 102177080 A | 9/2011 |

(Continued)

OTHER PUBLICATIONS

International Search Report for PCT/EP2015/052123 from International Bureau; Searching Authority: European Patent Office.

*Primary Examiner* — James R Bidwell
(74) *Attorney, Agent, or Firm* — Cislo & Thomas, LLP

(57) ABSTRACT

A device and a method for portioning a flow of individual products having an input-side conveying device continuously supplying individual products and at least two output-side conveying devices for continuously discharging the products. The output-side conveying devices are arranged vertically above one another. The input-side conveying device continuously transfers the products to a first output-side conveying device. The input-side and/or the output-side conveying devices are able to be pivoted in their position to transfer the products to one of the at least two output-side conveying devices, continuously or in batches. The input and output-side conveying devices may be circulating conveyor belts, in the form of front and/or rear ends, which are movable in the direction of conveyance and cooperate so that during the phase of adjusting the position of the input (Continued)

and/or the output-side conveying devices, the products on the input-side may be supplied continuously at uniform spacings from one another.

19 Claims, 2 Drawing Sheets

(51) Int. Cl.
*B65B 23/12* (2006.01)
*B65G 47/31* (2006.01)
*B65G 47/64* (2006.01)
*B65G 47/71* (2006.01)

(58) Field of Classification Search
USPC .............. 198/435, 436, 437, 369.2
See application file for complete search history.

(56) References Cited

U.S. PATENT DOCUMENTS

| | | | | |
|---|---|---|---|---|
| 4,166,525 A | * | 9/1979 | Bruno | ............. B65B 35/246 198/369.2 |
| 4,499,988 A | * | 2/1985 | Gasser | ............. B65G 21/14 198/369.2 |
| 4,807,741 A | | 2/1989 | Simelunas | |
| 4,809,842 A | * | 3/1989 | Aquino | ............. B65G 47/647 198/369.2 |
| 5,715,930 A | * | 2/1998 | Hogenkamp | ............. B65G 47/647 198/369.6 |
| 2013/0153364 A1 | * | 6/2013 | Bauer | ............. B65G 47/647 198/369.2 |
| 2013/0239525 A1 | | 9/2013 | Hammacher | |
| 2013/0319817 A1 | * | 12/2013 | Gahler | ............. B65G 43/00 198/369.2 |

FOREIGN PATENT DOCUMENTS

| | | |
|---|---|---|
| DE | 1166093 | 3/1964 |
| DE | 2519466 | 11/1976 |
| DE | 195 35 390 | 3/1997 |
| EP | 0124177 | 11/1984 |
| EP | 1 084 968 B1 | 3/2001 |
| GB | 1538161 A | 1/1979 |
| GB | 2119337 | 11/1983 |
| WO | WO/2009/059876 | 5/2009 |
| WO | WO/2010/049869 | 5/2010 |
| WO | WO 2012038475 | 3/2012 |

* cited by examiner

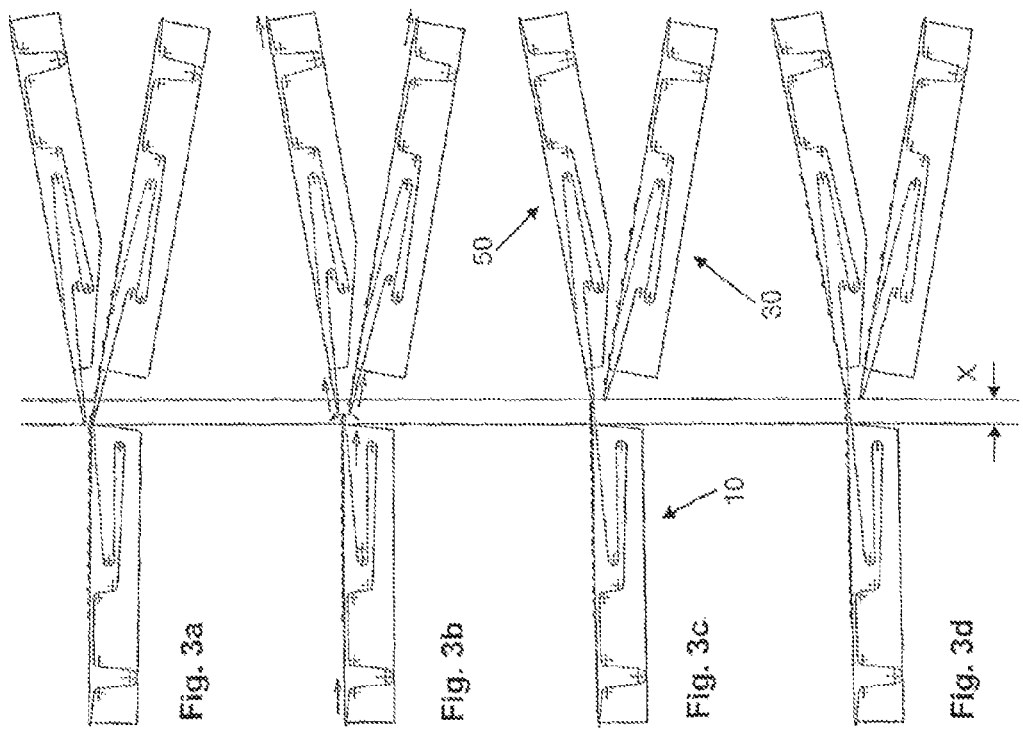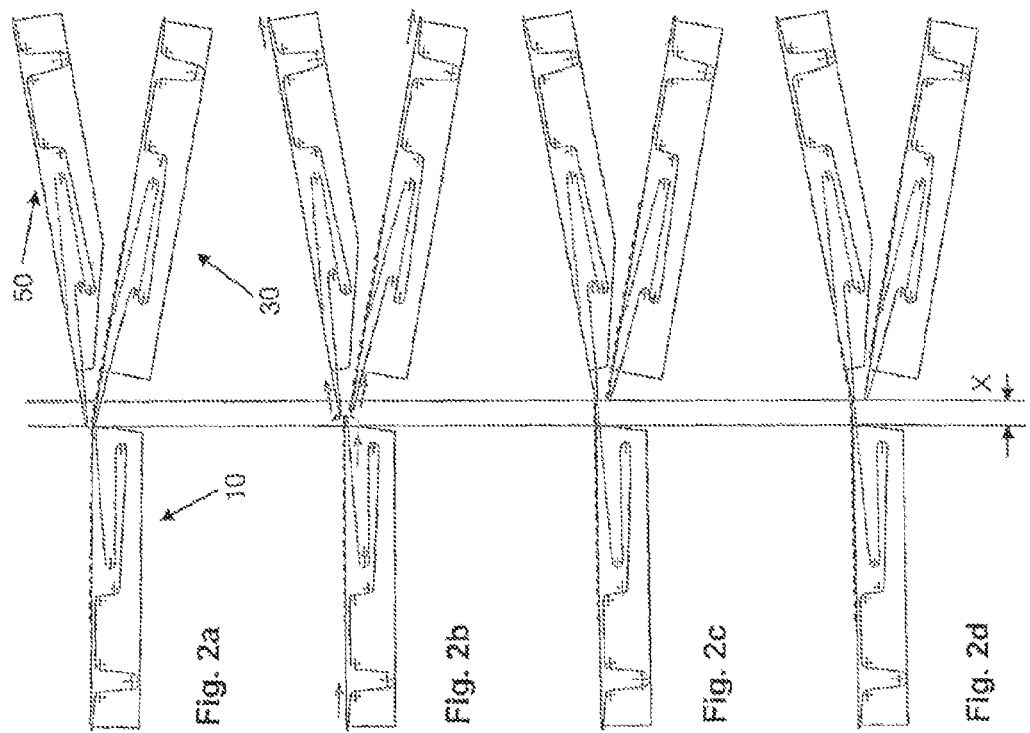

DEVICE AND METHOD FOR PORTIONING A FLOW OF INDIVIDUAL PRODUCTS

BACKGROUND OF THE INVENTION

The invention relates to a device and a method for portioning a flow of individual products, such that the products on the input side are supplied in one conveying plane and the products on the output side are distributed on at least two conveying planes arranged above one another for discharging the products.

The device and the method according to the invention may be used, for example, in combination with a packaging machine, the conveyed products being packaged thereby. The individual products may be, for example, fragile products of the confectionery or long-life bakery industry, such as for example cookies, chocolate products and the like. However, in addition to products of the food industry, for example, technical products are also conceivable such as electronic or electrical components, machine elements, pharmaceutical or medical products, and the like, which typically are produced and distributed in large quantities and which are supplied in sequence to a corresponding packaging carrier or packaging material. However, the method and the device according to the invention may also be used, for example, in the field of storage and transport logistics in connection with piece goods, packages and the like.

For example, a method and a device for filling a multiple-row packaging tray with individual products are disclosed in WO 2012/038475 A2, in particular a so-called tray-loading packaging machine. In this known packaging machine, batches of individual itemized products are formed, said products being transferred in sequence to a packaging tray at the end of a conveying path. The present invention may be used, for example, within the context of such a packaging machine.

In such packaging machines, the individual products are typically conveyed in rows and lanes located adjacent to one another and/or behind one another in a continuous flow by means of suitable conveying devices. The conveying devices are typically circulating endless conveyor belts, the products being located thereon and supplied to a downstream processing step, for example the transfer in sequence to a packaging container. In this case, the situation may occur that this downstream processing step causes technical problems by, for example, the malfunction of devices or machine parts or portions of the machine provided therefor. In such cases, however, it is undesirable to stop the entire machine system since the individual products typically on the input side are constantly supplied in large quantities, for example from a continuous product manufacturing process. Thus it is to be avoided that the entire system has to be stopped if only a specific partial region of the system malfunctions due to technical problems or errors. In known packaging machines, therefore, generally a second substantially identical machine part or portion of the system is provided for possible replacement of that machine part or area of the system which may potentially have technical problems. As soon as the first machine part, therefore, operates in a faulty manner or completely malfunctions, the products may be immediately diverted to the replacement machine part or replacement portion of the system. In this manner, the constant product flow supplied on the input side may pass unhindered and without interruption through the entire system.

Whilst normally, i.e. without the malfunction of the potentially problematical area of the machine, the products are continuously conveyed on the belt conveyor devices substantially in one plane or on one level, if the relevant first area of the machine malfunctions, said products are diverted to a different conveying plane or a different conveying level, on which they are conveyed to the aforementioned replacement area of the machine. To this end, the packaging machine may have a diverter in the conveying path, for example an adjustable or pivotable region of a conveying device or a pivotable partial conveyor belt, the products being able to be supplied thereby to one or the other downstream conveying plane, depending on the pivoted position.

Due to the aforementioned continuous uninterrupted supply of products on the input side of the entire machine, in particular in the case where the products are conveyed bearing closely against one another, i.e. substantially without spacing from one another, the further problem arises here that even during the phase of adjusting or pivoting the conveying device the products are supplied from one conveying plane to the other conveying plane whilst continuing to move on the conveyor belt. Therefore, it has to be ensured that the products are always able to be transferred to one of the two conveying planes continuously and in sequence, without it resulting in, for example, a blockage in the product flow. In particular, in the phase of adjusting or pivoting a relevant conveyor belt portion from one conveying level to a different conveying level, the supplied products are also not allowed to fall into an empty space at a front open edge of the conveyor belt in the direction of conveyance.

To this end, in the known conveying systems or packaging machines, batches of products are formed in the direction of conveyance, i.e. a batch of products is separated from the supplied continuous product flow in the direction of conveyance, by the products forming the batch being conveyed further at a higher conveying speed, following a specific interface in the conveying device, for example with a downstream second conveyor belt. In this manner, a spacing or a gap is formed between the product batch produced and the downstream continuous product flow.

Whilst the separated product batch, therefore, may be transferred to the first conveying plane which follows downstream, the gap formed behind this product batch is used so that the aforementioned conveyor belt portion subsequently has sufficient time in order to be pivoted, such that from now on a connection to the aforementioned second conveying plane is produced (whereby the connection to the first conveying plane is interrupted) so that the following products then may be supplied to the second conveying plane. The products may be supplied, therefore, via this second conveying plane to a functionally operational machine unit downstream, whilst the conveying path formed by the first conveying plane may be brought to a standstill in a phased manner or fully, so that for example the errors or problems of a machine unit arranged downstream of this first conveying path may be corrected.

It goes without saying that a pivoting of the conveyor belt from a first conveying plane to a second conveying plane, and optionally subsequently also to further conveying planes, may not only be used as a safety feature for bringing individual conveying path sections to a standstill, for example when machine units have malfunctioned, but also for other applications, such as for example the intentional, successive supply of product batches to different conveying planes in order to supply the product batches, for example in a targeted manner, cyclically to downstream processing steps in each case.

In the known conveying systems or packaging machines, the aforementioned formation of a leading product batch, which is separated from a continuous product flow by forming a gap, may be implemented, for example, by means of two circulating conveyor belts arranged directly behind one another. In this case, the first conveyor belt in the direction of conveyance of the products has a front or leading end and/or a front or leading edge in the direction of conveyance which is able to be advanced over a predetermined path in the direction of conveyance and which is subsequently able to be pulled back again counter to the direction of conveyance, whilst the conveyor belt moves the products further in the direction of conveyance. A second circulating conveyor belt is directly adjacent to this first circulating conveyor belt, said second conveyor belt having a rear or trailing end and/or a rear or trailing edge in the direction of conveyance which is able to be advanced over a predetermined path counter to the direction of conveyance and which is able to be pulled back in the direction of conveyance, whilst this second conveyor belt conveys the products. Each of the aforementioned two conveyor belts is a so-called "pull-nose conveyor belt" so that the interconnection of these two conveyor belts may be denoted as a "double pull-nose conveyor belt".

The system of movement of these two pull-nose conveyor belts arranged one behind the another is also visible, for example, in FIG. 1 of the accompanying drawings which shows the device according to the invention and in which the products are conveyed from left to right. In principle, in FIG. 1 the conveyor belt shown on the left-hand side may be compared with the aforementioned first conveyor belt which has its leading edge in FIG. 1 on its right-hand side (i.e. in the center of this drawing). In principle, in FIG. 1 the aforementioned second conveyor belt may be compared with the upper conveyor belt shown on the right-hand side, which has its trailing edge on its left-hand side, i.e. once again in the center of FIG. 1.

The aforementioned desired product batch is separated from the continuous product flow by the actual product conveying speed of the first conveyor belt being less than the product conveying speed of the second conveyor belt, the separated product batch being conveyed further thereon. At the same time, the rear edge of the second downstream conveyor belt opposing the direction of conveyance of the product moves below the products of the continuous product flow, back to a position of the product flow at which the product batch is intended to be separated from the product flow. Due to the greater conveying speed of the second conveyor belt, the product batch formed moves away from the trailing product flow in the direction of conveyance, whereby the gap is formed between the leading product batch and the trailing product flow and becomes successively larger. As soon as the gap which has been formed has reached the desired size which correlates with the time period of the above-described pivoting of the downstream conveyor belt portion between the two conveying planes, the above-described cycle starts from the front, i.e. the rear edge of the second conveyor belt passes again counter to the direction of conveyance below the products supplied in the continuous flow as far as the position at which the next product batch is intended to be separated from the product flow.

To the extent that the rear trailing edge of the second conveyor belt in this case is advanced counter to the direction of conveyance, the front leading edge of the first conveyor belt is pulled back counter to the direction of conveyance. In this case the two edges of the two conveyor belts are located substantially directly behind one another or bear against one another, so that in the transition from the first to the second conveyor belt in any case the product conveyance is not impaired, i.e. the products, for example, are not damaged or do not fall off the conveyor belts.

In a corresponding manner but in reverse, in the phase of gap formation, i.e. the removal of the separated product batch, the leading edge of the first conveyor belt is advanced in the direction of conveyance and at the same time the trailing edge of the second conveyor belt is pulled back in the direction of conveyance. In this case, the speed of the advance of the front edge of the first conveyor belt substantially corresponds to the product conveying speed of the first conveyor belt, whereby the products of the continuous product flow, as it were relative to the front edge of the first conveyor belt, are brought to a standstill, i.e. in this phase the products in the product flow do not substantially move relative to the front edge of the first conveyor belt although they are still conveyed further in the direction of conveyance by this conveyor belt.

As has been set forth above, the spacing formed between the separated product batch and the trailing continuous product flow serves to span the time which is required for pivoting a downstream partial conveyor belt from a first conveying plane, to which a first product batch is supplied, to a second conveying plane, to which a downstream product batch is supplied. As has also been described above, a second conveying plane, for example, may be required as a safety measure if a machine unit in the conveying path of the first plane malfunctions due to technical problems, so that this conveying path has to be shut down and the products have to be diverted to the second conveying path. If, however, such a product diversion is not required and the first conveying path is available unchanged, the product batches are still conveyed with a spacing from one another due to the above-described gap formation. Apart from this safety measure, however, the spacing formed generally has no further function and may even interfere with the further continuous processing (for example packaging) of the products. In particular, it may be necessary for the spacing formed between the individual successive product batches in the further sequence of the processing process to have to be removed again, i.e. a continuous product flow is formed again from the successive individual product batches. This requires additional technical measures which would be unnecessary if initially the spacing between the leading product batch and the trailing continuous product flow had not been formed.

SUMMARY OF THE INVENTION

Proceeding from the above-described devices and method, the object of the invention is to overcome the aforementioned drawbacks of the prior art and thus to provide an improved device and an improved method for portioning a flow of individual products. In particular, a method and a device are intended to be provided by which a continuous product flow may be transferred in each case to different conveying planes or conveying levels, without individual product batches having to be formed with corresponding spacings from one another. Thus a substantially seamless transfer of a continuous product flow from an input-side conveying device to one of several following output-side conveying devices on different conveying planes without the formation of gaps between the products is intended to be provided, wherein the product flow may be switched substantially seamlessly between the different conveying planes of the output-side conveying devices.

According to the invention, therefore, a device and a method for portioning a flow of individual products are provided, said device and method having the following device features and method steps: at least one input-side conveying device for continuously supplying individual products in one plane; at least two output-side conveying devices for continuously discharging the products in one respective plane, wherein the planes which are respectively assigned to the output-side conveying devices are arranged substantially vertically above one another; wherein one of the at least one input-side conveying device transfers the products to a first of the at least two output-side conveying devices during a first time period, continuously or in batches; wherein the input-side conveying device and/or the output-side conveying devices are able to be adjusted in their position such that the input-side conveying device transfers the products to a further conveying device of the at least two output-side conveying devices during a second time period which follows the first time period, continuously or in batches; and wherein the input-side conveying device and the at least two output-side conveying devices in each case comprise conveying means which cooperate such that during the phase of adjusting the position of the input-side conveying device and/or the output-side conveying devices, the products on the input-side conveying device may be supplied continuously and substantially at uniform spacings from one another.

In a particular embodiment of the method according to the invention and the associated method, the input-side conveying device and/or the output-side conveying devices are able to be adjusted in their position such that they are pivotable in the inclination of the planes of conveyance of the products.

In a further preferred embodiment of the invention, the input-side conveying device comprises a circulating conveying device, in particular a conveyor belt, which has a front end and/or a leading edge in the direction of conveyance which is able to be advanced over a predetermined path in the direction of conveyance and which is able to be pulled back counter to the direction of conveyance, whilst products are conveyed (a so-called pull-nose conveying device). Moreover, each of the output-side conveying devices preferably has a circulating conveying device, in particular a conveyor belt, which has a rear end and/or a trailing edge in the direction of conveyance which is able to be advanced over a predetermined path counter to the direction of conveyance and which is able to be pulled back in the direction of conveyance, whilst products are conveyed (a so-called pull-nose conveying device). Finally, the device according to the invention comprises control devices which coordinate the advancing movements and the pulling-back movements of the front end (leading edge) of the input-side conveying device and the rear ends (trailing edges) of the output-side conveying devices with the positional adjustment, in particular the pivoting movement, of the input-side conveying device and/or the output-side conveying devices.

In a development of the above embodiment of the invention initially the front end of the input-side conveying device is located in the pulled-back position and the rear end of the first output-side conveying device is located in the advanced position, whilst the input-side conveying device transfers the products to the first output-side conveying device. If the product conveyance is then intended to be switched from the first output-side conveying device to a different output-side conveying device, by the input-side conveying device and/or the output-side conveying devices being pivoted, the front end of the input-side conveying device moves into the advanced position and the rear ends of the first output-side conveying device and the relevant other output-side conveying device move into the pulled-back position. Finally, the front end of the input-side conveying device is located in the advanced position and the rear end of the relevant other output-side conveying device is located in the pulled-back position, whilst the input-side conveying device transfers the products to the relevant other output-side conveying device.

In order to permit subsequently a further switching of the product conveyance from a first output-side conveying device to another output-side conveying device, the front end of the input-side conveying device moves into the pulled-back position and the rear ends of the first output-side conveying device and the relevant other output-side conveying device move into the advanced position, whilst the input-side conveying device transfers the products to the relevant other output-side conveying device.

In a further advantageous embodiment of the invention, the speed of conveyance of the products on the respective relevant output-side conveying device is equal to the speed of conveyance of the products on the input-side conveying device. In this manner, the products are supplied as a continuous flow at uniform spacings on the input side and transferred to the output-side conveying device and conveyed further thereby, wherein the products are able to be located substantially at the same spacings or even seamlessly without spacings one behind the other.

In a further embodiment of the invention, the speed of conveyance of the products on the respective relevant output-side conveying device is greater than the speed of conveyance of the products on the input-side conveying device. In this manner, the continuously supplied product flow is lengthened when transferred to the output-side conveying device, i.e. the spacing between the individual products during the transfer is greater, wherein the products on the output-side conveying device are then located one behind the other at these larger but uniform spacings.

By means of the method according to the invention and the device according to the invention it is thus possible to transfer the products supplied as a product flow continuously on an input-side conveying device seamlessly to one of a plurality of output-side conveying devices, wherein the product flow is able to be switched from a first output-side conveying device to another output-side conveying device, without a product batch initially having to be separated from the product flow by forming a spacing or a gap. The time period which is required for switching the product flow supplied on the input side from the first conveying device to the other output-side conveying device, therefore, according to the invention no longer has to be compensated by a spacing which is formed by a product batch separated from the product flow.

According to the invention, the time period required for switching the product flow, for example by means of pivoting the conveying devices, is compensated by additional conveying means in the form of cooperating leading and/or trailing conveyor belt edges of the conveying devices on the input side and on the output side. The result of these additional conveying means is that during the phase of pivoting the conveying devices between the different output-side conveying planes or conveying levels the products may also be supplied on the input-side conveying device continuously and substantially at a uniform speed and at uniform spacings from one another, without the products falling into an empty space at the front end of the input-side conveying device, during the pivoting process. According to the invention, the products are thus always seamlessly and continuously transferred to one of the output-side conveying devices.

As is apparent from the above, according to the invention it may also be provided that the speed of the supply of products on the input-side conveying device is greater than the speed of adjustment of the position, in particular the pivoting of the input-side conveying device and/or the output-side conveying devices. This means that the products may continue to be supplied at a high frequency and, in spite of the pivoting of the conveying devices which is slower by comparison, the products may still be transferred continuously from the front conveying device to the relevant downstream conveying device, substantially without the formation of gaps and without interruption.

As is apparent from the above explanation of the prior art (for example in connection with the "double pull-nose conveying device") here a certain "switching time" is always present, within which there has to be a pause until the gap formed between the leading product batch and the trailing product flow arrives in the region of the "switching point" (i.e. the pivoting region of the conveying device). In this case, the "switching" (pivoting) is thus chronologically offset, i.e. the pivoting movement takes place only a certain time after the formation of the product batch. This is avoided in the present invention by no particular product batch and thus no gaps having to be formed between this product batch and the downstream product flow in order to "gain time" for the "switching". The device according to the invention thus to a certain extent permits an immediate "switching".

Since the input-side conveying device and the plurality of output-side conveying devices in each case are so-called pull-nose conveying devices, according to the number of pull-nose devices the entire device may be denoted as a "triple pull-nose conveying device" (with an input-side conveying device and two output-side conveying devices) or as a "multiple pull-nose conveying device".

Further details and advantages of the invention are revealed from the following detailed description of exemplary embodiments with reference to the accompanying drawings, in which:

BRIEF DESCRIPTION OF THE DRAWINGS

FIGS. 2a to 2d show the device according to the invention according to FIG. 1 in different positions of the input-side and output-side conveying devices;

FIGS. 3a to 3d show a further embodiment of the device according to the invention in the same positions of the input-side and output-side conveying devices as in FIGS. 2a to 2d.

DETAILED DESCRIPTION OF THE INVENTION

Figure 1:
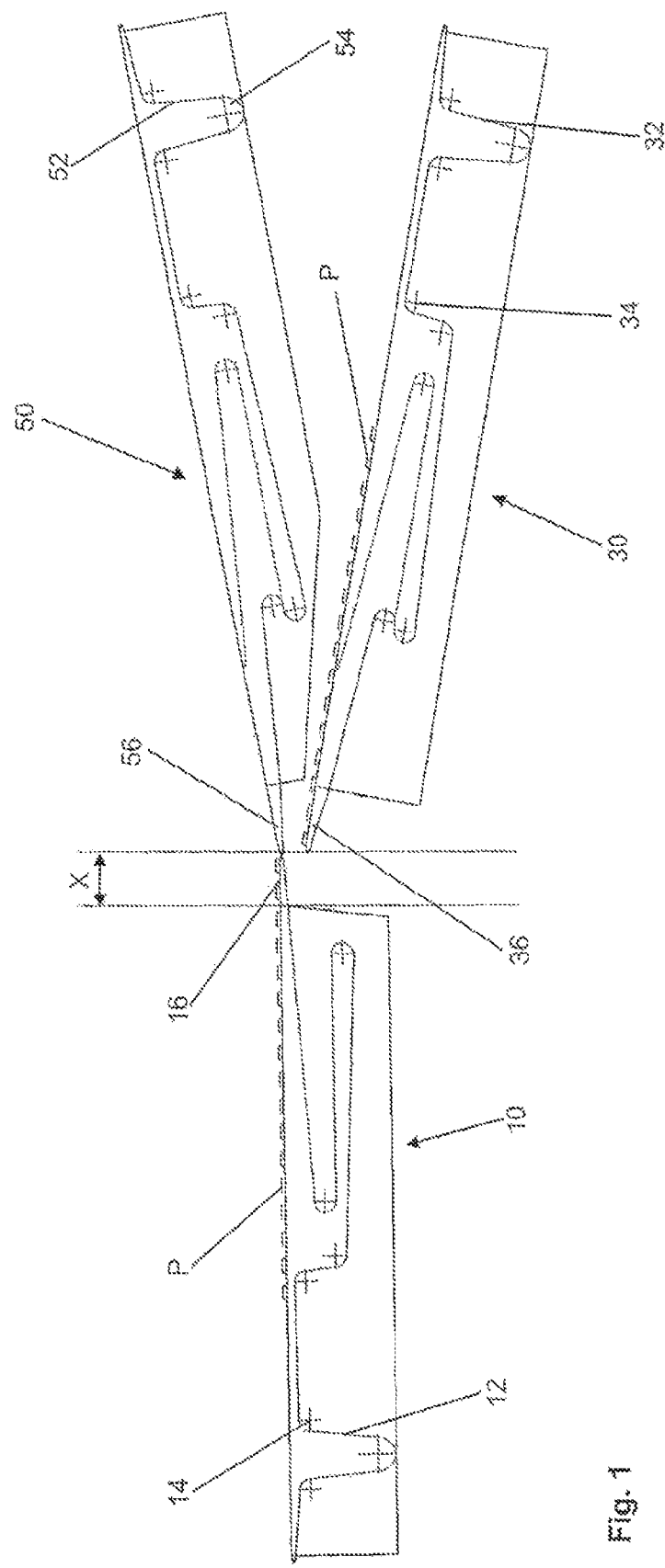
FIG. 1 shows a device according to the invention schematically in a view from the side.

As FIG. 1 shows, a device for portioning a flow of individual products P initially consists of at least one input-side conveying device 10, by means of which the products P are continuously supplied from the left (in FIG. 1) and conveyed to the right (in FIG. 1). The device shown in FIG. 1 also consists of two superimposed output-side conveying devices 30, 50, the products P being continuously discharged thereby from the left (in FIG. 1) to the right (in FIG. 1). In the embodiment shown, the input-side and output-side conveying devices 10, 30, 50 are circulating conveying devices, in particular conveyor belts 12, 32, 52, wherein however chain conveyors and the like are also conceivable. The circulating conveyor belts 12, 32, 52 are guided via deflection elements, in particular deflection rollers 14, 34, 54, which are partially displaceable in the position thereof. By means of these deflection rollers 14, 34, 54 which are able to be changed in the position thereof, the active conveying path of the respective conveying device 10, 30, 50 for the products P may be altered, in particular lengthened or shortened, in particular on a path section X at the transition from the input-side conveying device 10 to the output-side conveying devices 30, 50, as is explained below in detail.

The input-side conveying device 10 is able to be pivoted vertically, for example about one or more pivot points, such that it transfers the supplied products P during a first time period to one of the two output-side conveying devices 30, 50 shown and such that after the pivoting, during a second following time period, it transfers the products P to the other of the two output-side conveying devices 30, 50 shown. In FIG. 1 the input-side conveying device 10 is located in the pivoted position in which it is able to transfer the products P to the upper output-side conveying device 50 shown. By altering the vertical position, i.e. by a pivoting of the input-side conveying device downwardly, the input-side conveying device 10 may adopt a position such that the products P may then be transferred to the lower output-side conveying device 30 shown in FIG. 1.

In an alternative embodiment, it is possible that instead of the input-side conveying device 10 the two output-side conveying devices 30, 50 are able to be pivoted, for example, about one or more pivot points such that it is possible to transfer the product from the input-side conveying device 10 optionally to one of the two output-side conveying devices 30, 50. In a further embodiment it is also conceivable that both the input-side conveying device 10 and the output-side conveying devices 30, 50 may be pivoted. In any case, the angle of inclination of the plane of the relevant conveying device, the products P being conveyed in each case thereon, is altered by the pivoting movement.

In the arrangement shown in FIG. 1 the product conveying planes of the two output-side conveying devices 30, 50 are arranged at an acute angle to one another and are respectively arranged at an obtuse angle to the product conveying plane of the input-side conveying device 10. In this case, in particular, the product conveying plane of the input-side conveying device 10 may correspond to the product conveying plane of the output-side conveying device 30, 50 to which the input-side conveying device 10 transfers the products P in each case, i.e. the two product conveying planes in this case have the same angle of inclination. In other words, the products P in this case are transferred in a straight line and without a deviation and/or alteration to their direction of conveyance from the input-side conveying device 10 to the relevant output-side conveying device 30, 50. In a further modification it is also conceivable that at least one of the planes of conveyance of the product of the input-side conveying device 10 and/or the output-side conveying devices 30, 50 is arranged substantially horizontally.

In a further embodiment, not shown in the drawings, it is also conceivable that the conveying devices are not pivoted but displaced as a whole vertically in a linear manner. As a result, the angle of inclination of the product conveying plane of the respective relevant conveying device is not altered. In a development of this embodiment it is also conceivable that the product conveying planes of one or more of the conveying devices are arranged substantially horizontally.

As is also shown in FIG. 1, the input-side conveying device 10 and the two output-side conveying devices 30, 50 in each case comprise conveying means 16, 36, 56 which cooperate so that during the phase of pivoting the input-side conveying device 10 (and/or optionally the output-side conveying devices 30, 50) the products P are also able to be supplied and conveyed on the input-side conveying device 10 continuously and substantially at a uniform speed and at uniform spacings from one another. These conveying means consist, in particular, of movable elements which are able to lengthen or shorten the conveying path of the respective relevant conveying device in the direction of conveyance. To this end, the conveyor belts 12, 32, 52 in these regions are able to be lengthened or shortened by means of the displaceable deflection rollers 14, 34, 54.

In particular, to this end the input-side conveying device 10 has a front end and/or a leading edge 16 in the direction of conveyance which is able to be advanced over a predetermined path X in the direction of conveyance and which is able to be pulled back counter to the direction of conveyance, whilst the input-side conveying device 10 conveys products. In a corresponding manner, each of the output-side conveying devices 30, 50 comprises a rear end and/or a trailing edge 36, 56 in the direction of conveyance which is able to be advanced over a predetermined path X counter to the direction of conveyance and which is able to be pulled back in the direction of conveyance, in particular even while the relevant output-side conveying device 30, 50 conveys products. These conveying means are thus so-called pull-nose conveying devices.

In the situation shown in FIG. 1, the front end 16 of the input-side conveying device 10 is located in its advanced or extended position, whereby the conveying path of the input-side conveying device 10 is extended by the path X. Depending on requirements, this front end 16 of the input-side conveying device 10 may be pulled back by the path X counter to the direction of conveyance of the products, whereby the conveying path of the input-side conveying device 10 is correspondingly reduced.

Accordingly, in FIG. 1 the rear ends 36, 56 of the two output-side conveying devices 30, 50 in each case are located in their pulled-back or retracted position. If required, the rear ends may be advanced or extended counter to the direction of conveyance over the path X, whereby the conveying paths of the output-side conveying devices 30, 50 are correspondingly lengthened.

As is explained hereinafter with reference to FIGS. 2a to 2d, the respective advancing movements and pulling back movements of the front end 16 of the input-side conveying device 10 and the rear ends 36, 56 of the two output-side conveying devices 30, 50 are coordinated and/or synchronized by means of suitable sensor and control devices (not shown in the drawings) with the pivoting movement of the input-side conveying device 10, in order to carry out the desired continuous product flow from the input-side conveying device 10 to one of the two output-side conveying devices 30, 50 and subsequently to the other of the two output-side conveying devices 30, 50, without the product flow having to be interrupted and/or without product batches on the input side having to be initially separated from the continuously supplied product flow by forming a gap or a spacing, as has been explained above.

The devices shown in FIGS. 2a to 2d and hereinafter also in FIGS. 3a to 3d and the components thereof correspond to the device shown in FIG. 1 and the components thereof. For reasons of clarity, therefore, the reference numerals in FIGS. 2a to 2d and FIGS. 3a to 3d have been substantially omitted.

FIG. 2a shows the situation in which the products P are continuously transferred from the input-side conveying device 10, and substantially with uniform spacings, to the lower output-side conveying device 30 of the two output-side conveying devices shown. In this phase, the front end 16 of the input-side conveying device 10 is in its pulled-back or retracted position whilst the rear end 36 of the relevant lower output-side conveying device 30 is located in its advanced and/or extended position. The rear end 36 of the lower output-side conveying device 30 in this case follows more or less without a gap the front end 16 of the input-side conveying device 10, so that the products P may be transferred without negative effects, i.e. without damage and without being displaced in their relative position in the entire product flow, from the input-side conveying device 10 to the output-side conveying device 30.

If for specific reasons (as has been explained above) the product flow is no longer intended to be conveyed on the lower output-side conveying device 30 and, therefore, is intended to be diverted to a different output-side conveying device, in particular the upper output-side conveying device 50 shown in the drawings, the input-side conveying device 10 is pivoted upwardly, so that the front end 16 of the input-side conveying device is able to adjoin the rear end 56 of the upper output-side conveying device 50. To this end, the front end 16 of the input-side conveying device 10 moves during the pivoting movement into its advanced, extended position, and at the same time, in particular the rear end 56 of the upper output-side conveying device 50 moves into its pulled-back, retracted position. Normally, in this case at the same time the rear end 36 of the lower output-side conveying device 30 may also move into its pulled-back, retracted position. This situation is shown in FIGS. 2b and 2c, wherein FIG. 2c substantially corresponds to FIG. 1.

At the end of the pivoting movement of the input-side conveying device 10 and the advancing movement of the input side front end 16 and the pulling-back movements of the output side rear ends 36, 56 the front end 16 of the input-side conveying device 10 is located in its fully advanced position and here adjoins more or less without gaps the rear end 56 of the upper output-side conveying device 50, which is located in its pulled-back position. The products P, therefore, may now be transferred from the input-side conveying device 10 to the upper output-side conveying device 50, as is shown in FIGS. 2c and 2d. The products P in this case substantially maintain their relative position within the product flow, i.e. they are transferred to the output-side conveying device 50 continuously and substantially at uniform spacings and without other negative effects or damage and conveyed further thereby.

Whilst the products P are transferred from the input-side conveying device 10 to the upper output-side conveying device 50, the front end 16 of the input-side conveying device 10 is now moved into its pulled-back position, i.e. in FIG. 2d to the left (following the position shown in FIG. 2d). At the same time, the rear end 56 of the upper output-side conveying device 50 is moved into its advanced, extended position (i.e. also to the left in FIG. 2d). In this case, the two ends 16, 56 as before follow one another more or less without gaps, so that the products P may also continue to be transferred from the input-side conveying device 10 to the upper output-side conveying device 50 without interference. At the same time, the rear end 36 of the lower output-side conveying device 30 is also moved into its advanced extended position (i.e. again to the left in FIG. 2d). In this manner, all conveying devices are to a certain extent guided back into an initial position in order to prepare a further pivoting of the input-side conveying device 10, now downwardly with a change of the transfer of the product flow again to the lower output-side conveying device 30.

In the phase of pivoting the input-side conveying device 10 from the one output-side conveying device 30 to the other output-side conveying device 50, as shown in FIG. 2b, the front end 16 of the input-side conveying device 10 moves at a speed $V_{ne}$ into its advanced position which is at least equal to or greater than the speed $V_{pe}$ of conveyance of the products P on the input-side conveying device 10. As a result, the products P conveyed on the input-side conveying device 10 during the pivoting process do not fall from the input-side conveying device 10 at the front end 16 and into an empty space. By advancing the input-side front end 16 at at least the conveying speed of the products P, the conveying path of the input-side conveying device 10 is lengthened for the duration of the pivoting, such that the products P in this phase still remain on the input-side conveying device 10 until at the end of the pivoting process said input-side conveying device adjoins the relevant rear end 36, 56 of the respective relevant output-side conveying device 30, 50.

FIGS. 2a to 2d show the application in which the products P at uniform spacings from the input-side conveying device 10 are transferred to the relevant output-side conveying device 30 and/or 50. To this end, it is necessary that the speed $V_{pa1}$, $V_{pa2}$ of conveyance of the products P on the respective relevant output-side conveying device 30, 50 is equal to the speed $V_{pe}$ of conveyance of the products P on the input-side conveying device 10. In other words, this means that the belt speeds of the input-side conveying device 10 and the relevant output-side conveying device 30, 50 are of the same value.

In a further application which is shown as a further exemplary embodiment, in particular in FIGS. 3a to 3d, the speed $V_{pa1}$, $V_{pa2}$ of conveyance of the products P on the respective relevant output-side conveying device 30, 50 (i.e. the belt speed thereof) may be greater than the speed $V_{pe}$ of conveyance of the products P on the input-side conveying device 10 (i.e. the belt speed thereof). In this manner, a larger spacing is produced between the individual products P on the respective relevant output-side conveying device 30, 50 when transferred from the input-side conveying device 10. In other words, the products P are conveyed further on the relevant output-side conveying device 30, 50 with a spacing which is larger than the spacing between the individual products in the supply of the input-side conveying device 10.

If the conveying speed or transport speed of the output-side conveying devices 30, 50 is greater than the conveying speed or transport speed of the input-side conveying device 10, for the displacement speeds of the front and/or rear, input and/or output side ends 16, 36, 56 a value is selected between the two transport speeds of the conveying devices, whereby a safety region is produced at the two front and/or rear input-side and/or output-side ends 16, 36, 56. On the input side the end 16 in this case may move more rapidly than the transport speed of the conveying device 10, i.e. the end 16 wanders in the direction of conveyance in front of the product P furthest to the front. On the output side, the end 36, 56, may move more slowly than the transport speed of the conveying devices 30, 50, whereby in the direction of conveyance the end 36, 56 remains downstream of the last product P.

In both embodiments of the conveying speed of the output-side conveying devices 30, 50 corresponding to FIGS. 2a to 2d and/or FIGS. 3a to 3d, in the pivoting phase of the input-side conveying device 10 (see FIG. 2b and/or FIG. 3b) the rear end 36, 56 of the respective relevant output-side conveying device 30, 50 is only allowed to move at a speed $V_{na1}$, $V_{na2}$ into its pulled-back position (i.e. in the drawings to the right) which is equal to or less than the speed $V_{pa1}$, $V_{pa2}$ of conveyance of the products P on the relevant output-side conveying device 30, 50. The function of this again is so that the products P in the region of the respective rear end 36, 56 of the relevant output-side conveying device 30, 50 do not fall off said output-side conveying device, provided they have not yet been removed from the relevant conveying device at their respective conveying speed, from the region of the relevant rear ends 36, 56.

So that during the pivoting movement of the input-side conveying device 10 it does not lead to a collision between the front end 16 thereof and the respective rear ends 36, 56 of the two output-side conveying devices 30, 50, the rear end 36, 56 of the respective relevant output-side conveying device 30, 50 has to move at a speed $V_{na1}$, $V_{na2}$ into its pulled-back position (i.e. to the right in the drawings) which is equal to or greater than the speed $V_{ne}$ at which the front end 16 of the input-side conveying device 10 moves into its advanced position (to the right again in the drawings).

In the above-described rearward movement of the front and/or rear ends 16, 36, 56 of the conveying devices 10, 30, 50 into the initial position (to the left in the drawings), following the position of FIG. 2d and/or 3d, for a further pivoting of the input-side conveying device 10, the front end 16 of the input-side conveying device 10 has to move back at a speed $V_{ne}$ (i.e. to the left in the drawings) which is equal to the speed $V_{na1}$, $V_{na2}$ of the movement of the rear ends 36, 56 of the output-side conveying devices 30, 50 into their advanced positions (again to the left in the drawings). This is in turn required so that no gaps are produced between the input-side front end 16 and the relevant output-side rear end 36 and/or 56, through which the products P could fall from the conveying devices. Instead at these speed ratios it is once again ensured that the input-side conveying device 10 is able to transfer the products P continuously and without negative effects (displacement, damage, etc) to the relevant output-side conveying device 30 and/or 50. In this phase, the position at which the input-side front end 16 substantially adjoins the relevant output-side rear end 36 and/or 56, to a certain extent passes counter to the direction of conveyance of the products P (i.e. over the path X from right to left in the drawings) below the conveyed product flow.

It applies to all of the variants shown above, in principle, that the products P on the input-side conveying device 10 may be supplied such that they are located substantially without spacings behind one another (i.e. in contact with one another), or that they are located at substantially the same spacings behind one another (i.e. without contact with one another).

From the above descriptions, it is also apparent that it is possible to eject the products P if required in the region of the path section X from the entire system, if a gap or opening is formed between the front end 16 of the input-side conveying device 10 and the relevant rear end 36, 56 of the output-side conveying devices 30, 50. To this end, by a suitable choice of speeds of movement and directions of movement of the ends 16, 36, 56 of the conveying devices 10, 30, 50, the ends 16, 36, 56 may be moved apart by being moved in the direction of their pulled-back or retracted positions, i.e. unlike the above-described embodiments in that they do not adjoin one another substantially seamlessly.

The invention claimed is:

1. A device for portioning a flow of individual products, characterized by the following features:
at least one input-side conveying device for continuously supplying individual products in a first plane of conveyance;
at least two output-side conveying devices for continuously discharging the products in at least a second plane of conveyance and a third plane of conveyance, respectively, wherein the second and third planes which are respectively assigned to the at least two output-side conveying devices are arranged substantially vertically above one another;
wherein one of the at least one input-side conveying device transfers the products seamlessly to a first of the at least two output-side conveying devices during a first time period, continuously or in batches;
wherein at least one input-side conveying device and the at least two output-side conveying devices are adjustable in their respective positions such that the input-side conveying device transfers the products seamlessly to a second of the at least two output-side conveying devices during a second time period which follows the first time period, continuously or in batches;
wherein the at least one input-side conveying device and the at least two output-side conveying devices in each case comprise conveying means which cooperate so that during the phase of adjusting the position of the at least one of the input-side conveying device and the at least two output-side conveying devices, the products on the at least one input-side conveying device may be supplied continuously and substantially at uniform spacings from one another;
wherein the at least one input-side conveying device has a front end relative to the direction of conveyance which is able to be advanced over a first predetermined path in the direction of conveyance and which is able to be pulled back counter to the direction of the conveyance, whilst the products are conveyed;
wherein the at least two output-side conveying devices each has a rear end relative to the direction of conveyance which is able to be advanced over a second predetermined path counter to the direction of conveyance and which is able to be pulled back in the direction of conveyance, whilst products are conveyed; and
wherein the device comprises control devices which coordinate the advancing movements and the pulling-back movements of the front end of the at least one input-side conveying device and the rear ends of the at least two output-side conveying devices, with the positional adjustment of at least one of the input-side conveying device and the at least two output-side conveying devices.

2. The device as claimed in claim 1, characterized in that at least one of the input-side conveying device and the at least two output-side conveying devices are adjustable in their position such that they are pivotable in the inclination of the planes of conveyance of the products.

3. The device as claimed in claim 1, characterized in that the second and third planes of conveyance of the products are arranged on the at least two output-side conveying devices at an acute angle to one another, and the second and third planes of conveyance on the at least two output-side conveying devices are arranged in each case at obtuse angles to the first plane of conveyance on the at least one input-side conveying device.

4. The device as claimed in claim 1, characterized in that at least one of the planes of conveyance of the products on the at least one input-side conveying device and the at least two output-side conveying devices is arranged horizontally.

5. The device as claimed in claim 1, characterized in that the first plane of conveyance of the products on the input-side conveying device corresponds to one of the planes of conveyance of the products on the at least two output-side conveying device to which the input-side conveying device in each case transfers the products.

6. The device as claimed in claim 1, characterized in that the at least one input-side conveying device and the at least two output-side conveying devices have circulating conveying devices.

7. The device as claimed in claim 1, characterized in that a speed of the supply of products on the at least one input-side conveying device is greater than a speed of adjustment of the position of at least one of the input-side conveying device and the at least two output-side conveying devices.

8. A method for portioning a flow of individual products characterized in that it is embodied by a device as claimed in claim 1.

9. The method as claimed in claim 8, characterized in that the front end of the at least one input-side conveying device is located in the pulled-back position and the rear end of a first output-side conveying device is located in the advanced position, whilst the at least one input-side conveying device transfers the products to a first output-side conveying device;
the front end of the input-side conveying device moves into the advanced position and the rear ends of a first output-side conveying device and a second output-side conveying device move into the pulled-back position whilst at least one of the input-side conveying device and the at least two output-side conveying devices are pivoted; and
the front end of the at least one input-side conveying device is located in the advanced position and the rear end of a second output-side conveying device is located in the pulled-back position, whilst the at least one input-side conveying device transfers the products to a second output-side conveying device.

10. The method as claimed in claim 9, characterized in that the front end of the at least one input-side conveying device moves into the pulled-back position and the rear ends of the first output-side conveying device and a second output-side conveying device move into the advanced position, whilst the at least one input-side conveying device transfers the products to a second output-side conveying device.

11. The method as claimed in claim 9, characterized in that the front end of the at least one input-side conveying device moves at a speed into the advanced position which is equal to or greater than a speed of conveyance of the products on the at least one input-side conveying device.

12. The method as claimed in claim 8, characterized in that a speed of conveyance of the products on a respective relevant output-side conveying device is equal to or greater than a speed of conveyance of the products on the at least one input-side conveying device.

13. The method as claimed in claim 9, characterized in that the rear end of a respective relevant output-side conveying device moves at a speed into the pulled-back position which is equal to or less than a speed of conveyance of the products on a relevant output-side conveying device.

14. The method as claimed in claim 9, characterized in that the rear end of a respective relevant output-side conveying device moves at a speed into the pulled-back position which is equal to or greater than a speed at which the front end of the at least one input-side conveying device moves into the advanced position.

15. The method as claimed in claim 10, characterized in that the rear end of a respective relevant output-side conveying device moves at a speed into the advanced position which is equal to a speed at which the front end of the at least one input-side conveying device moves into the pulled back position.

16. The method as claimed in claim 8, characterized in that the products are supplied on the at least one input-side conveying device, wherein the products are located substantially without spacings behind one another or wherein they are located at substantially the same spacings behind one another.

17. The method as claimed in claim 8, where a back end of the at least two output-side conveying devices are fixed and a front end of the at least two output-conveyors may pivot in relation to a back end of the at least one input-conveyor.

18. The method as claimed in claim 8, where the at least two output-side conveying devices are disposed at an angle in relation to the at least one input-side conveying device.

19. The method as claimed in claim 8, where the at least one input-side conveying device pivots in relation to a front end of the at least one input-side conveying device.

* * * * *